US011772815B2

(12) United States Patent
Brown et al.

(10) Patent No.: US 11,772,815 B2
(45) Date of Patent: Oct. 3, 2023

(54) METHODS AND APPARATUS TO RECOVER UNMANNED AERIAL VEHICLES WITH KITES

(71) Applicant: Insitu, Inc., a subsidiary of The Boeing Company, Bingen, WA (US)

(72) Inventors: Benjamin T. Brown, Hood River, OR (US); Alice E. Fockele, Portland, OR (US); Jesse D. Kiewit, Bingen, WA (US); Jacob S. Allen, Hood River, OR (US); John R. Wong, Klickitat, WA (US); Kelly A. Comstock, Carson, WA (US); Daniel L. Shaw, White Salmon, WA (US)

(73) Assignee: INSITU, INC. (A SUBSIDIARY OF THE BOEING COMPANY), Bingen, WA (US)

( * ) Notice: Subject to any disclaimer, the term of this patent is extended or adjusted under 35 U.S.C. 154(b) by 0 days.

(21) Appl. No.: 17/365,560

(22) Filed: Jul. 1, 2021

(65) Prior Publication Data
US 2023/0002075 A1    Jan. 5, 2023

(51) Int. Cl.
*B64C 31/06*        (2020.01)
*B64F 1/02*         (2006.01)
*B64C 39/02*        (2023.01)

(52) U.S. Cl.
CPC ............ *B64F 1/0295* (2020.01); *B64C 31/06* (2013.01); *B64C 39/022* (2013.01)

(58) Field of Classification Search
CPC ..... B64F 1/0295; B64C 31/06; B64C 39/022; B64C 2201/182
See application file for complete search history.

(56) References Cited

U.S. PATENT DOCUMENTS

| 4,753,400 | A  | * | 6/1988 | Reuter ................... | B64F 1/027 |
| | | | | | 244/116 |
| 6,264,140 | B1 | * | 7/2001 | McGeer ................ | B64F 1/0295 |
| | | | | | 244/116 |
| 7,114,680 | B2 | * | 10/2006 | Dennis ..................... | B64F 1/06 |
| | | | | | 244/110 E |
| 11,008,101 | B2 | * | 5/2021 | Miller ...................... | B64D 1/22 |
| 2005/0017129 | A1 | * | 1/2005 | McDonnell .............. | B64F 1/10 |
| | | | | | 244/110 G |
| 2006/0038067 | A1 | | 2/2006 | Dennis | |

(Continued)

OTHER PUBLICATIONS

European Patent Office, "Extended European Search Report," issued in connection with European Application No. 22182504.5, dated Oct. 28, 2022, 14 pages.

*Primary Examiner* — Tye William Abell
(74) *Attorney, Agent, or Firm* — HANLEY, FLIGHT & ZIMMERMAN (57) ABSTRACT

Methods, apparatus, systems and articles of manufacture are disclosed. A disclosed example apparatus to recover an aircraft includes a mast extending from a base, a boom extending from the mast at a first end of the boom to a second end of the boom opposite the first end, a tether line extending between the mast to the base and guided by the boom, a portion of the tether line extending between the second end of the boom and the base, and a mount to operatively coupled the a kite to the tether line, the kite to support the tether line as the aircraft contacts the portion for recovery thereof.

24 Claims, 4 Drawing Sheets

(56) References Cited

U.S. PATENT DOCUMENTS

| | | | |
|---|---|---|---|
| 2015/0360797 A1* | 12/2015 | Melish | B64F 1/02 |
| | | | 244/110 C |
| 2016/0375981 A1* | 12/2016 | McDonnell | B64C 39/029 |
| | | | 244/13 |
| 2017/0320592 A1* | 11/2017 | Chen | B64F 1/04 |
| 2019/0071176 A1* | 3/2019 | von Flotow | B64C 39/024 |
| 2020/0140082 A1 | 5/2020 | von Flotow et al. | |
| 2020/0369406 A1* | 11/2020 | von Flotow | B64F 1/0299 |
| 2021/0171216 A1 | 6/2021 | Brown et al. | |
| 2021/0171217 A1 | 6/2021 | Brown et al. | |

* cited by examiner

METHODS AND APPARATUS TO RECOVER UNMANNED AERIAL VEHICLES WITH KITES

FIELD OF THE DISCLOSURE

This disclosure relates generally to aircraft and, more particularly, to methods and apparatus to recover unmanned aerial vehicles with kites.

BACKGROUND

In recent years, unmanned aerial vehicles (UAVs) or drones have been used to fly significant distances to transport payloads (e.g., packages, supplies, equipment, etc.) or gather information. Some UAVs land on runways while others are captured in flight by UAV recovery systems. Capturing UAVs without the use of a runway enables greater flexibility in recovery locations. In particular, a UAV can be recovered in an unprepared area or on relatively smaller ships or other vessels or vehicles.

SUMMARY

An example apparatus to recover an aircraft includes a mast extending from a base, a boom extending from the mast at a first end of the boom to a second end of the boom opposite the first end, a tether line extending between the mast to the base and guided by the boom, a portion of the tether line extending between the second end of the boom and the base, and a mount to operatively couple a kite to the tether line, the kite to support the tether line as the aircraft contacts the portion for recovery thereof.

An example method to recover an aircraft includes launching a first kite to support a tether line, the tether line extending from a mast to a base, the tether line guided by a boom that extends from a first end of the boom to a second end of the boom opposite the first end, the first end positioned at the mast, contacting the aircraft with a portion of the tether line that extends from the second end of the boom to the base to decelerate the aircraft, and retrieving the aircraft from the tether line.

An example aircraft recovery system includes a kite, a tether line to be supported by the kite, and a boom to guide the tether line, the boom extending from a first end of the boom to a second end of the boom opposite the first end, the first end positioned at the mast, a portion of the tether line extending between the second end of the boom and a base, the portion to be contacted with an aircraft to decelerate the aircraft during recovery thereof.

The figures are not to scale. Instead, the thickness of the layers or regions may be enlarged in the drawings. In general, the same reference numbers will be used throughout the drawing(s) and accompanying written description to refer to the same or like parts. As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another. As used in this patent, stating that any part is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections.

DETAILED DESCRIPTION

Methods and apparatus to recover unmanned aerial vehicles (UAVs) with kites are disclosed. Some UAVs are recovered by recovery systems, which employ a recovery tether line that is suspended vertically. In particular, a UAV contacts and/or impacts the tether line and, as a result, the UAV is decelerated and/or stopped from flight, thereby enabling recovery of the UAV without need for a runway. In some known implementations, a parachute or support beam is used to suspend the tether line for recovery of the UAV.

Examples disclosed herein enable highly controlled and cost-effective recovery of an aircraft (e.g., a UAV) via a stationary platform or a moving vehicle or vessel (e.g., a ship, etc.). Examples disclosed herein enable aircraft to be recovered without a significant amount of force and/or stress imparted to the aircraft. As a result, examples disclosed herein can enable aircraft that do not require significant structural components that can be costly and have a significant amount of weight.

Examples disclosed herein include a kite that supports a tether line. The tether line extends between a mast and a base. Further, the tether line is guided by a boom that extends from the mast. When an aircraft is being recovered, the aircraft is brought into contact with a portion of the tether line that extends between an end of the boom (e.g., a distal end of the boom) and the base. The aircraft is decelerated by the tether line causing movement of the kite and, thus, dissipating kinetic energy of the aircraft. As a result, the aircraft encounters reduced impact and deceleration forces in contrast to known recovery systems. According to some examples disclosed herein, the portion of the tether line is positioned on a first side of the boom while the kite is positioned on a second side of the boom opposite the first side (e.g., the portion of the tether line is positioned below the boom while the kite is positioned above the boom).

In some examples, the tether line is guided through a fixed point (e.g., a fixed point loop or ring) of the aforementioned boom. In some examples, the tether line is coupled to the kite via an alpine butterfly knot of the tether line (e.g., positioned on the tether line). In some examples, a brake is implemented to decelerate the tether line and, in turn, the aircraft subsequent to the aircraft impacting the tether line. Additionally or alternatively, a spring is implemented to dampen movement of the tether line, the boom and/or the kite. In some examples, the boom is telescoping and/or an angle of the boom can be adjusted to vary an amount of deceleration imparted to the aircraft during recovery thereof. In some examples, kites coupled to the tether line are interchangeable and/or selectable for different kite configurations, aircraft configurations and/or kite recovery requirements.

Figure 1:
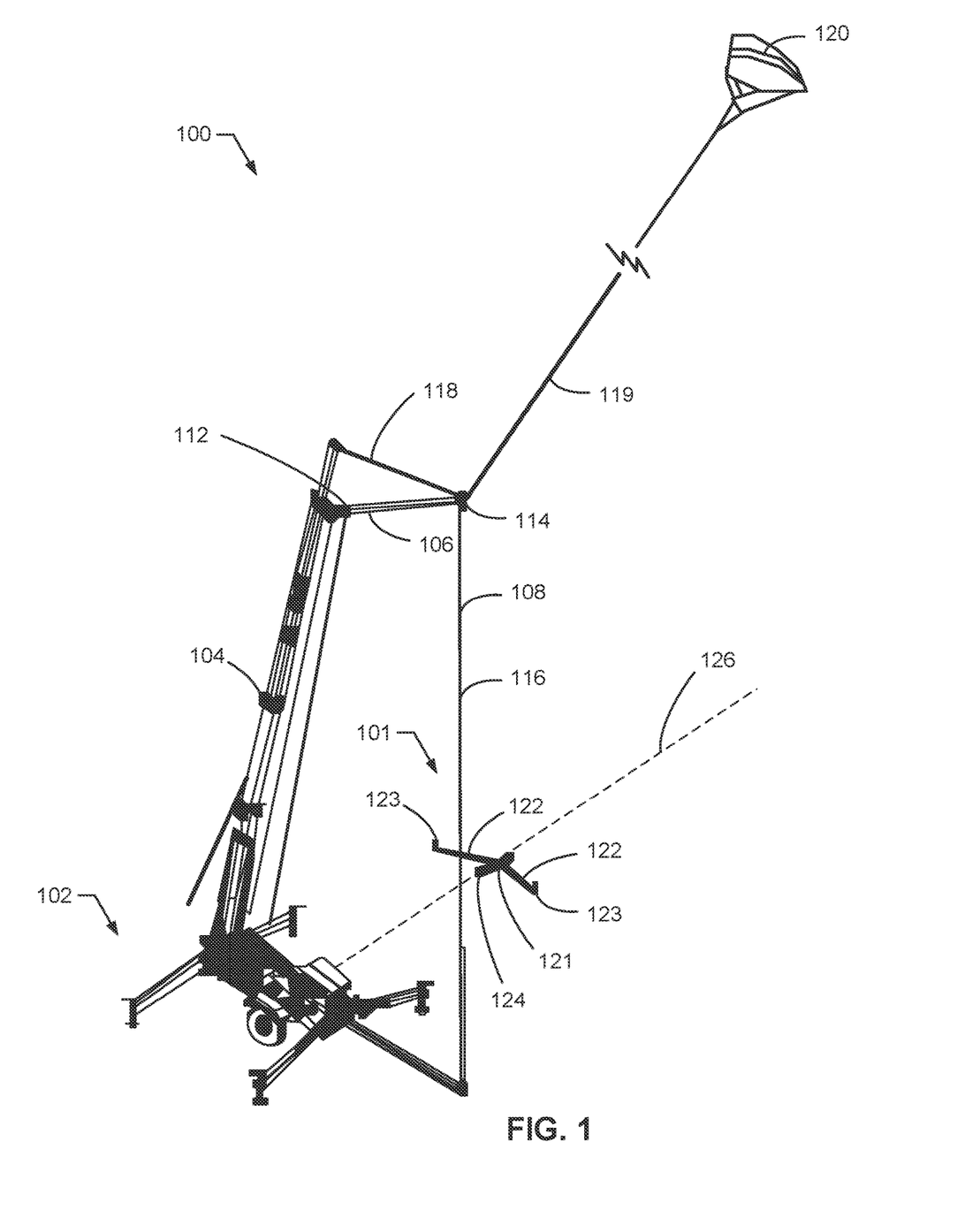
FIG. 1 depicts an unmanned aerial vehicle (UAV) recovery system in accordance with teachings of this disclosure.

FIG. 1 depicts an unmanned aerial vehicle (UAV) recovery system 100 in accordance with teachings of this disclosure. The UAV recovery system 100 of the illustrated example is implemented to recover an aircraft 101 and includes a base 102, a mast 104, a boom 106, and a tether line 108. In this example, the boom 106 includes a first end (e.g., a proximal end) 112 at the mast 104 and a second end (e.g., a distal end) 114 of the boom 106 that is opposite the first end 112. The tether line 108 of the illustrated example extends from the mast 104 to the base 102, and is guided by the boom 106. Further, a first portion 116 of the tether line 108 extends from the base 102 and/or the ground associated with the base 102 to the second end 114 for contact with the UAV 101 while a second portion 118 of the tether line 108 extends between the second end 114 and the mast 104 to constrain/guide the tether line 108. In the illustrated example, a kite 120 is shown with at least one support line 119 coupled to the tether line 108 at or proximate the second end 114. Further, the example kite 120 is depicted deployed above the mast 104 as well as the boom 106. As will be discussed in greater detail below in connection with FIG. 2, in this example, the kite 120 is coupled to the tether line 108 to dissipate energy during impact of the UAV 101 with the tether line 108. In other examples, the tether line 108 extends above the boom 106 to the kite 120 (e.g., the tether line 108 extends to the kite 120, returns from the kite 120, extends across the boom 106 and back to the mast 104).

The example UAV 101 includes a fuselage 121, wings 122 each of which includes a distal capture portion 123, and a propulsion system 124. In this example, the distal capture portion 123 extends from at least one of the corresponding wings 122 generally along a direction of movement of the UAV 101. However, any appropriate type of capture or recovery mechanism can, instead, be implemented on any other portion and/or component (e.g., the fuselage 121) of the UAV 101. Further any other appropriate type of propulsion of the UAV 101 can be implemented.

To recover and/or capture the UAV 101 as the UAV 101 moves along a flight path 126, one of the distal capture portions 123 is brought into contact with the first portion 116 of the tether line 108 extending between the boom 106 and the base 102. The UAV 101 contacting the tether line 108 causes the kite 120 to displace, thereby decelerating the UAV 101 in a highly effective and controlled manner. As a result, the UAV 101 is brought to a rest or stop with minimal force and/or stress and remains attached to the tether line 108. In this example, the first portion 116 of the tether line 108 is suspended by the boom 106 (e.g., substantially vertically in the air, within 5 degrees from vertical) above the base 102 but is also operatively coupled to the kite 120 so that the kite 120 can facilitate controlled deceleration of the UAV 101.

Figure 2:
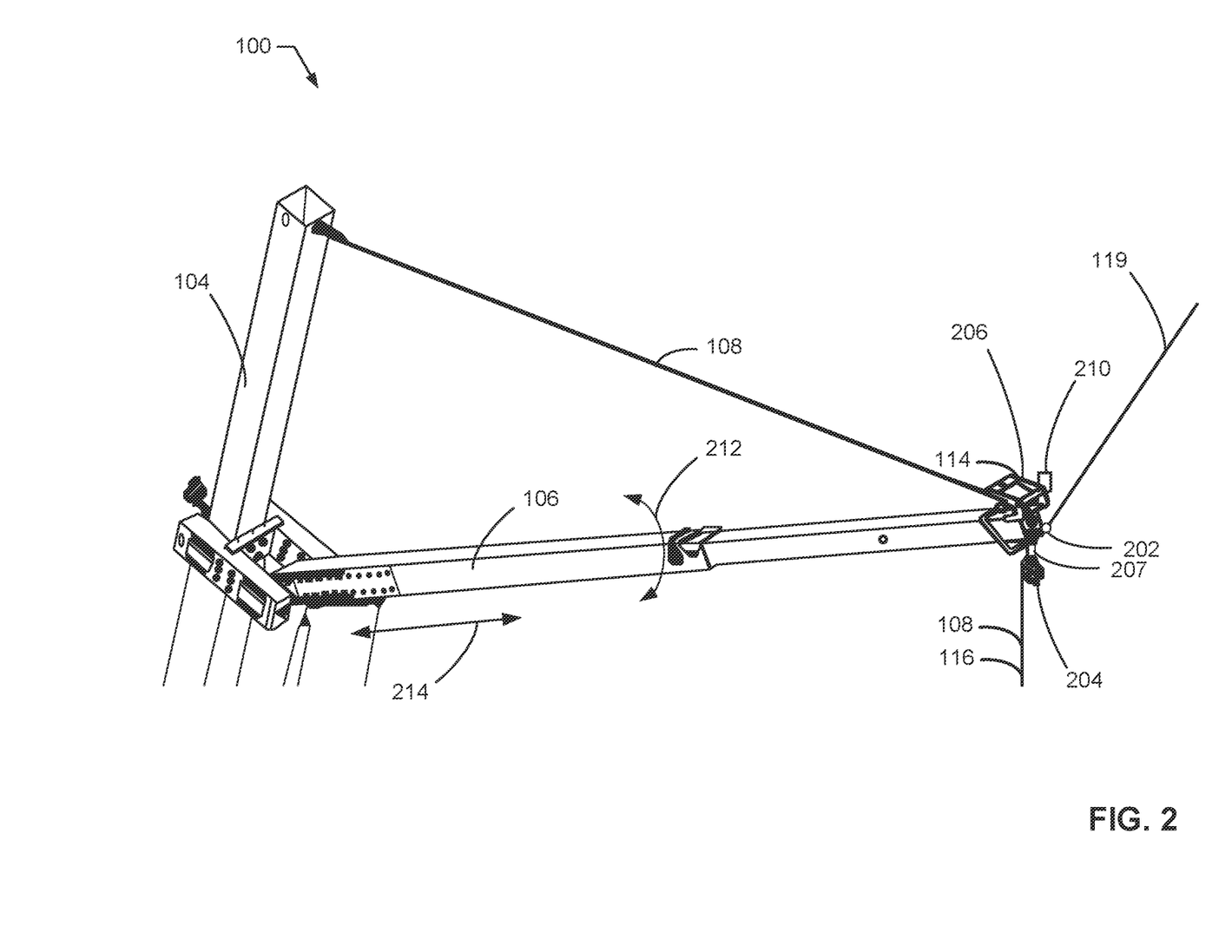
FIG. 2 is a detailed view of a portion of the example UAV recovery system of FIG. 1.

FIG. 2 is a detailed view of a portion of the example UAV recovery system 100 of FIG. 1. As can be seen in the illustrated example of FIG. 2, the boom 106 is depicted extending from the mast 104. As mentioned above in connection with FIG. 1, the tether line 108 is attached to the kite 120 of FIG. 1. In particular, the support line 119 of the kite 120 is coupled to the tether line 108 at a mount 202, which can operate as a coupling point (e.g., a fixed point) between the tether line 108 and the support line 119. The mount 202 can be positioned on the tether line 108 or the boom 106 (e.g., the second end 114 of the boom 106). In other examples, the tether line 108 extends above the boom 106 to contact the kite 120. In some examples, the support line 119 is integral with the tether line 108. In this example, a pulley (e.g., a one-way pulley, a braking pulley, etc.) 204 and guides 206 direct and/or guide the tether line 108 from the base 102 shown in FIG. 1 to the boom 106 and, in turn, the mast 104. As a result, the guided movement of the tether line 108 enables kinetic energy from the UAV 101 to be effectively dissipated as the UAV 101 is being decelerated during recovery thereof.

In the illustrated example, to couple movement of the tether line 108 with displacement and/or movement of the kite 120 when the UAV 101 is brought into contact with the portion 116 of the tether line 108, the support line 119 is coupled to the tether line 108 via the mount 202, which operates as a fixed point of the tether line 108 in this example. In particular, the example mount 202 moves and/or displaces along with tether line 108 during deceleration of the UAV 101, thereby causing the kite 120 to move (e.g., causing a sudden or jerking motion of the kite 120). The example mount 202 can be implemented as or generally shaped as a loop or ring (e.g., a ring, an annular ring, a loop of the tether line 108, etc.) to couple the support line 119 to the tether line 108. As will be discussed in greater detail below in connection with FIG. 3, the support line 119 can be attached to a loop or ring defined by the tether line 108. In some examples, the mount 202 is defined as a tied knot of the tether line 108. Additionally or alternatively, the pulley 204 and the guides 206 can be adjusted to vary deceleration of the UAV 101.

In some examples, a spring 207 is implemented to dampen motion of the tether line 108 and/or the kite 120. In some examples, a brake 210 is implemented to control movement of the tether line 108, the pulley 204 and/or the kite 120. For example, the brake 210 can be operatively coupled to the pulley 204 to vary rotational movement of the pulley 204 and, in turn, motion of the tether line 108 and the kite 120 can be accurately controlled. The brake 210 can be electronically-controlled, force-controlled (e.g., via a force-reaction device) or manually-controlled. In some examples, as generally indicated by a double arrow 212, an angle of the boom 106 relative to the mast 104 can be adjusted to vary a degree to which the kite 120 decelerates the UAV 101 shown in FIG. 1. Additionally or alternatively, a height at which the kite 120 is positioned is changed to vary the degree to which the kite 120 decelerates the UAV 101. In some examples, as generally indicated by a double arrow 214, the boom 106 is telescoping and its longitudinal length can be varied to change a degree to which the kite 120 decelerates the UAV 101.

In some other examples, different kites are interchanged and/or selected based on a type or configuration of aircraft being recovered and/or environmental conditions (e.g., wind conditions, kite hovering height limitations, etc.). In other words, different kites can be coupled to the tether line 108 and/or the mount 202 based on different aircraft configuration types and/or environmental conditions. In some such examples, utilization of the aforementioned mount 202 facilitates interchangeability between the different kites by enabling relatively easy and quick installation of the kites.

Figure 3:
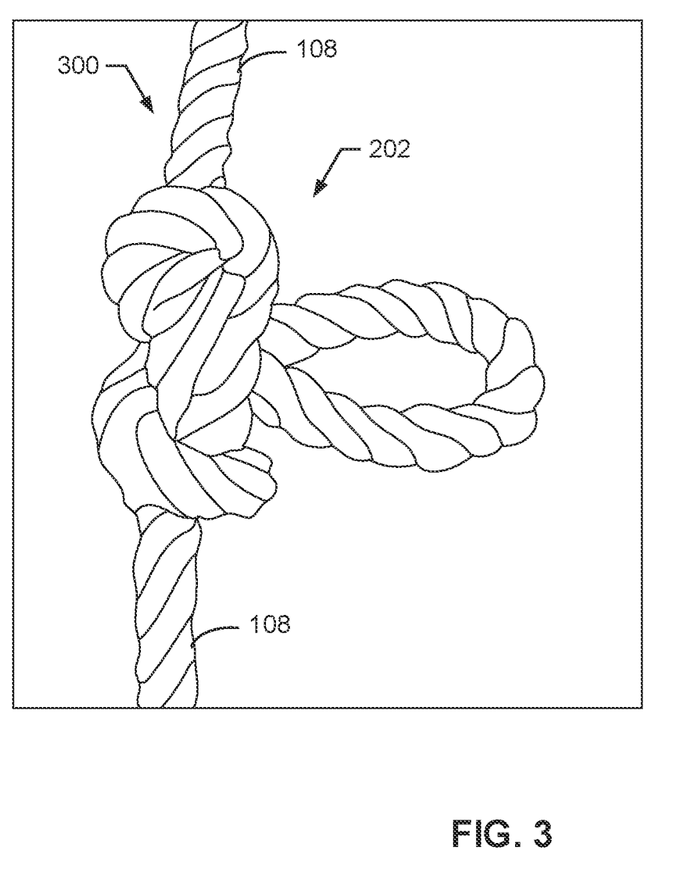
FIG. 3 is a detailed view of an example loop that can be implemented in examples disclosed herein.

FIG. 3 is a detailed view of an example loop 300 that can be implemented in examples disclosed herein. In particular, the example loop 300 can be implemented onto the tether line 108 and/or the mount 202. The loop 300 of the illustrated example is positioned on or proximate the second end 114 of the boom 106 shown in FIG. 1. In this particular example, the loop 300 is implemented as an alpine butterfly knot of the tether line 108. However, any other appropriate knot (e.g., a figure 8 knot, a noose knot, a square knot, an overhand knot, a slip knot, etc.) or other looped/loop-like structure can be implemented instead.

Figure 4:
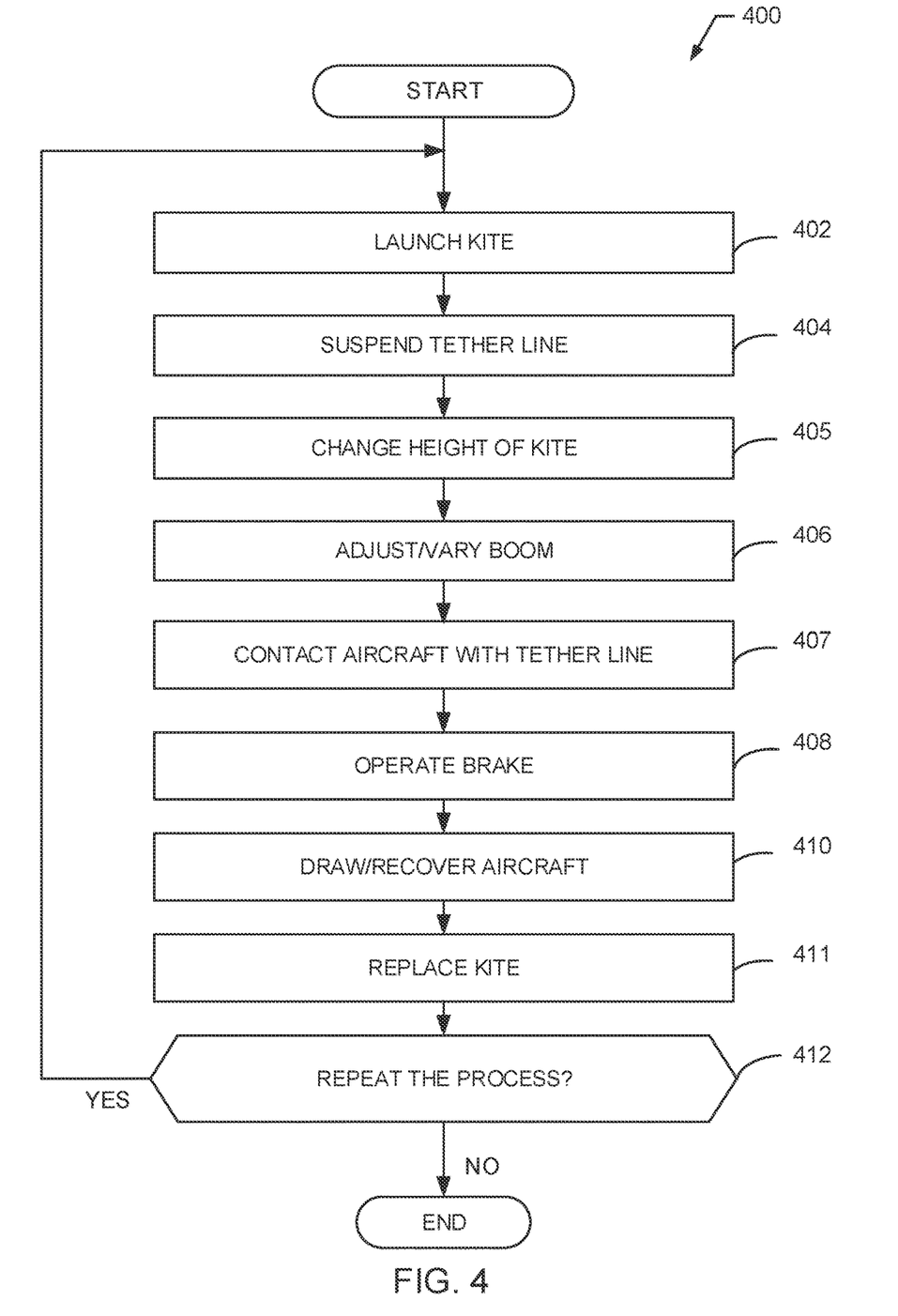
FIG. 4 is a flowchart representative of an example method to implement the example UAV recovery system of FIG. 1.

FIG. 4 is a flowchart representative of an example method 400 to implement the example UAV recovery system 100 of FIG. 1. In this example, an aircraft (e.g., the UAV 101) is going to be recovered by the tether line 108 and the kite 120 is to decelerate the UAV 101 during recovery of the UAV 101.

At block 402, the kite 120 is launched and/or deployed. In this example, the kite 120 is coupled to the tether line 108 (e.g., at the mount 202), thereby coupling motion between the kite 120 and the tether line 108. In other words, movement of at least a portion of the tether line 108 causes movement of the kite 120. In some examples, a height to which the kite 120 is launched is varied based on a desired degree of deceleration of the aircraft (e.g., a greater height corresponds to a greater degree of deceleration of the aircraft).

At block 404, the tether line 108 is suspended by the kite 120 operatively coupled thereto. In the illustrated example, the portion 116 of the tether line 108 is suspended (e.g., held in tension) between the boom 106 and the base 102 and/or the ground for impact with the aircraft. In some examples, the tether line 108 is routed through a fixed point of at least one of the boom 106 and/or the tether line 108.

At block 405, in some examples, a height at which the kite 120 is deployed is changed and/or adjusted. In some such examples, the height may be adjusted on flight data of the aircraft and/or changing conditions (e.g., changing wind conditions, changing weather conditions, etc.).

At block 406, in some examples, the boom 106 is adjusted. In some examples, an angle of the boom 106 (e.g., an angle of the boom 106 from the ground) is adjusted to vary a degree of deceleration of the aircraft. Additionally or alternatively, a longitudinal length of the boom 106 is adjusted (e.g., the boom 106 is telescoping).

At block 407, the aircraft is brought into contact with the tether line 108. In this example, the aircraft is flown along a flight path that results in a distal portion of a wing of the aircraft contacting the tether line 108. In turn, the aircraft is decelerated to a stop as the tether line 108 moves the kite 120. In other words, movement of kite 120 dissipates kinetic energy of the aircraft. In some examples, the aircraft is coupled (e.g., releasably coupled) to the tether line 108 in response to impacting the tether line 108 (e.g., the aircraft hangs from the tether line 108 after impacting the tether line 108).

At block 408, in some examples, the brake 210 is operated. In particular, the brake 210 can be operated to slow down and/or prevent movement of the tether line 108 as the aircraft is being recovered (i.e., after the aircraft has been brought to a rest via the tether line 108 and the kite 120). Additionally or alternatively, the brake 210 is implemented to prevent, reduce and/or dampen movement of the tether line 108 as the aircraft is being decelerated (e.g., to prevent excess movement of the tether line 108 prior to the aircraft being recovered). The example brake 210 can be implemented to reduce and/or slow down movement of the pulley 204. According to some examples, the spring 207 is implemented (e.g., in-line with or operatively coupled to the tether line 108, at the mount 202, between the support line 119 and the tether line 108, etc.) to dampen motion of the tether line 108 and/or the kite 120 during recovery of the aircraft.

At block 410, the aircraft is drawn in toward the base 102. In some examples, the tether line 108 is displaced and/or moved (e.g., moved linearly, moved by a winch) so that the aircraft can be removed from the tether line 108. In some examples, an operator removes the aircraft from the tether line 108 as the aircraft is suspended by the tether line 108.

At block 411, in some examples, the kite 120 is replaced with another kite, which can correspond to a different type or configuration of aircraft being recovered, etc. In some such examples, the replacement kite is coupled to the tether line 108 at the mount 202.

At block 412, it is determined whether to repeat the process. If the process is to be repeated (block 412), control of the process returns to block 402. Otherwise, the process ends. This determination may be based on whether additional aircraft are to be recovered.

Example 1 includes an apparatus to recover an aircraft. The apparatus includes a mast extending from a base, a boom extending from the mast at a first end of the boom to a second end of the boom opposite the first end, a tether line extending between the mast to the base and guided by the boom, a portion of the tether line extending between the second end of the boom and the base, and a mount to operatively couple a kite to the tether line, the kite to support the tether line as the aircraft contacts the portion for recovery thereof.

Example 2 includes the apparatus as defined in example 1, wherein the mount defines a fixed point of the boom.

Example 3 includes the apparatus as defined in any of examples 1 or 2, wherein the mount defines a fixed point of the tether line.

Example 4 includes the apparatus as defined in any of examples 1 to 3, wherein the mount includes a loop.

Example 5 includes the apparatus as defined in example 4, wherein the loop includes an alpine butterfly knot.

Example 6 includes the apparatus as defined in any of examples 1 to 5, further including a brake operatively coupled to the tether line.

Example 7 includes the apparatus as defined in any of examples 1 to 6, further including a spring operatively coupled to the tether line.

Example 8 includes the apparatus as defined in any of examples 1 to 7, wherein the aircraft is to contact the tether line on a first side of the boom, and wherein the kite is to be positioned on a second side of the boom opposite the first side.

Example 9 includes the apparatus as defined in any of examples 1 to 8, wherein the portion of the tether line extends generally vertical with respect to the ground.

Example 10 includes the apparatus as defined in any of examples 1 to 9, wherein the boom is telescoping.

Example 11 includes a method to recover an aircraft. The method includes launching a first kite to support a tether line, the tether line extending from a mast to a base, the tether line guided by a boom that extends from a first end of the boom to a second end of the boom opposite the first end, the first end positioned at the mast, contacting the aircraft with a portion of the tether line that extends from the second end of the boom to the base to decelerate the aircraft, and retrieving the aircraft from the tether line.

Example 12 includes the method as defined in example 11, wherein contacting the aircraft with the portion of the tether line includes coupling the aircraft to the tether line.

Example 13 includes the method as defined in any of examples 11 or 12, further including changing a distance from the second end of the boom to the kite to vary an amount of deceleration of the aircraft.

Example 14 includes the method as defined in any of examples 11 to 13, further including changing an angle of the boom relative to the ground to vary an amount of deceleration of the aircraft.

Example 15 includes the method as defined in any of examples 11 to 14, further including routing the tether line through a fixed point at the second end of the boom.

Example 16 includes the method as defined in any of examples 11 to 15, wherein the kite is a first kite, and further including replacing the first kite with a second kite different form the first kite based on at least one of an aircraft configuration or environmental conditions.

Example 17 includes the method as defined in any of examples 11 to 16, further including varying a length of the boom to vary an amount of deceleration of the aircraft.

Example 18 includes an aircraft recovery system having a kite, a tether line to be supported by the kite, and a boom to guide the tether line, the boom extending from a first end of the boom to a second end of the boom opposite the first end, the first end positioned at the mast, a portion of the tether line extending between the second end of the boom and a base, the portion to be contacted with an aircraft to decelerate the aircraft during recovery thereof.

Example 19 includes the aircraft recovery system as defined in example 18, further including a loop of the tether line to be coupled to a support line of the kite.

Example 20 includes the aircraft recovery system as defined in example 19, wherein the loop includes an alpine butterfly knot.

From the foregoing, it will be appreciated that example methods, apparatus and articles of manufacture have been disclosed that enable highly controlled and cost-effective recovery of aircraft. Examples disclosed herein can also reduce forces and/or stresses imparted to aircraft during recovery thereof. Examples disclosed herein also enable aircraft that have a relatively light weight and low cost because they do not necessitate significant structural reinforcements and components for landing, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus to recover an aircraft, the apparatus comprising:
   a mast extending from a base;
   a boom extending from the mast at a first end of the boom to a second end of the boom opposite the first end;
   a tether line extending between the mast to the base and guided by the boom, a portion of the tether line extending between the second end of the boom and the base; and
   a mount to operatively couple a kite to the tether line, the kite to support the tether line as the aircraft contacts the portion for recovery thereof.

2. The apparatus as defined in claim 1, wherein the mount defines a fixed point of the boom.

3. The apparatus as defined in claim 1, wherein the mount defines a fixed point of the tether line.

4. The apparatus as defined in claim 1, further including a brake operatively coupled to the tether line.

5. The apparatus as defined in claim 1, further including a spring operatively coupled to the tether line.

6. The apparatus as defined in claim 1, wherein the aircraft is to contact the tether line on a first side of the boom, and wherein the kite is to be positioned on a second side of the boom opposite the first side.

7. The apparatus as defined in claim 1, wherein the portion of the tether line extends substantially vertical with respect to the ground.

8. The apparatus as defined in claim 1, wherein the boom is telescoping.

9. The apparatus as defined in claim 1, wherein a portion of the tether line extends from the second end of the boom to a distal end of the mast.

10. The apparatus as defined in claim 1, wherein the mount includes a loop.

11. The apparatus as defined in claim 10, wherein the loop includes an alpine butterfly knot.

12. The apparatus as defined in claim 1, wherein the boom can pivot relative to the mast.

13. The apparatus as defined in claim 12, wherein the boom pivots about the mast at the first end of the boom.

14. The apparatus as defined in claim 13, further including a support line at the second of the boom that is to be coupled to the kite.

15. A method to recover an aircraft, the method comprising:
launching a kite to support a tether line, the tether line extending from a mast to a base, the tether line guided by a boom that extends from a first end of the boom to a second end of the boom opposite the first end, the first end positioned at the mast;
contacting the aircraft with a portion of the tether line that extends from the second end of the boom to the base to decelerate the aircraft; and
retrieving the aircraft from the tether line.

16. The method as defined in claim 15, wherein contacting the aircraft with the portion of the tether line includes coupling the aircraft to the tether line.

17. The method as defined in claim 15, further including changing a distance from the second end of the boom to the kite to vary an amount of deceleration of the aircraft.

18. The method as defined in claim 15, further including changing an angle of the boom relative to the ground to vary an amount of deceleration of the aircraft.

19. The method as defined in claim 15, further including routing the tether line through a fixed point at the second end of the boom.

20. The method as defined in claim 15, wherein the kite is a first kite, and further including replacing the first kite with a second kite different form the first kite based on at least one of an aircraft configuration or environmental conditions.

21. The method as defined in claim 15, further including varying a length of the boom to vary an amount of deceleration of the aircraft.

22. An aircraft recovery system comprising:
a kite;
a tether line to be supported by the kite; and
a boom to guide the tether line, the boom extending from a first end of the boom to a second end of the boom opposite the first end, the first end positioned at a mast, a portion of the tether line extending between the second end of the boom and a base, the portion to be contacted with an aircraft to decelerate the aircraft during recovery thereof.

23. The aircraft recovery system as defined in claim 22, further including a loop of the tether line to be coupled to a support line of the kite.

24. The aircraft recovery system as defined in claim 23, wherein the loop includes an alpine butterfly knot.

* * * * *